United States Patent
Goldstein et al.

(10) Patent No.: US 10,453,005 B2
(45) Date of Patent: *Oct. 22, 2019

(54) METHOD AND SYSTEM FOR GENERATING OCCUPANT SCHEDULES

(75) Inventors: Rhys Goldstein, Toronto (CA);
Alexander Tessier, Toronto (CA);
Azam Khan, Aurora (CA)

(73) Assignee: AUTODESK, INC., San Rafael, CA (US)

( * ) Notice: Subject to any disclaimer, the term of this patent is extended or adjusted under 35 U.S.C. 154(b) by 896 days.

This patent is subject to a terminal disclaimer.

(21) Appl. No.: 13/206,352

(22) Filed: Aug. 9, 2011

(65) Prior Publication Data
US 2013/0041632 A1 Feb. 14, 2013

(51) Int. Cl.
*G06Q 10/04* (2012.01)
*G06Q 10/06* (2012.01)

(52) U.S. Cl.
CPC ............. *G06Q 10/06* (2013.01); *G06Q 10/04* (2013.01)

(58) Field of Classification Search
USPC .......................................................... 703/2
See application file for complete search history.

(56) References Cited

U.S. PATENT DOCUMENTS

| | | | |
|---|---|---|---|
| 6,216,098 B1 | 4/2001 | Clancey et al. | |
| 7,155,720 B2 | 12/2006 | Casati et al. | |
| 2003/0036820 A1 | 2/2003 | Yellepeddy et al. | |
| 2007/0168307 A1 | 7/2007 | Floudas et al. | |
| 2009/0172035 A1 | 7/2009 | Lessing et al. | |
| 2009/0184823 A1 | 7/2009 | Tessier | |
| 2012/0066168 A1* | 3/2012 | Fadell | G05B 15/02 706/52 |
| 2012/0265501 A1 | 10/2012 | Goldstein et al. | |
| 2012/0265506 A1 | 10/2012 | Goldstein et al. | |

FOREIGN PATENT DOCUMENTS

| | | |
|---|---|---|
| CN | 1330335 A | 1/2002 |
| CN | 102096861 A | 6/2011 |

(Continued)

OTHER PUBLICATIONS

Erickson, Varick L., et al. "Energy efficient building environment control strategies using real-time occupancy measurements." Proceedings of the First ACM Workshop on Embedded Sensing Systems for Energy-Efficiency in Buildings. ACM, 2009.*

(Continued)

*Primary Examiner* — Saif A Alhija
(74) *Attorney, Agent, or Firm* — Artegis Law Group, LLP

(57) ABSTRACT

Embodiments of the present invention generally relate to the modeling of building occupant behavior. An embodiment of the present invention relates to a method for generating interdependent schedules in an occupant simulation model. Within schedules generated in accordance with the present invention may be included activities that require the attendance of other occupants. Disclosed are methods for distributing multi-occupant activities among other occupants of a building. In another embodiment of the present invention, personas are used to generate simulated occupant schedules from a limited number of real-world occupant surveys. Characteristics of the real-world schedules are manipulated so as to fit desired characteristics. Multiple persona models are disclosed.

25 Claims, 12 Drawing Sheets

(56) References Cited

FOREIGN PATENT DOCUMENTS

| WO | 03/090038 A2 | 10/2003 |
|---|---|---|
| WO | 2011/034901 A1 | 3/2011 |

OTHER PUBLICATIONS

Non-Final Office Action dated May 14, 2013, U.S. Appl. No. 13/206,357, filed Aug. 9, 2011, 14 pages.

Final Office Action dated Nov. 7, 2013, U.S. Appl. No. 13/206,357, filed Aug. 9, 2011, 16 pages.

Vincent Tabak. User Simulation of Space Utilisation: System for Office Building Usage Simulation, PhD thesis, Eindhoven University of Technology, Netherlands (2008).

Rhys Goldstein, Alex Tessier & Azam Khan. Customizing the Behavior of Interacting Occupants using Personas, SimBuild 2010 Conference Proceedings: IBPSA-USA SimBuild Conference (Aug. 2010).

Rhys Goldstein, Alex Tessier & Azam Khan. Schedule-Calibrated Occupant Behavior Simulation, SimAUD 2010 Conference Proceedings: Symposium on Simulation for Architecture and Urban Design. pp. 3-10 (Apr. 2010).

International Search Report and Written Opinion, dated Dec. 7, 2012, International Application No. PCT/US12/49871, filing date Aug. 7, 2012, 17 pages.

Non-Final Office Action dated Jun. 5, 2014, U.S. Appl. No. 13/206,357, filed Aug. 9, 2011, 20 pages.

Chuang Wang, Da Yan, Yi Jiang, A novel approach for building occupancy simulation, Build Simul (2011) 4: pp. 149-167 DOI 10.1007/s12273-011-0044-5.

Zimmerman, G. 2007. Modeling and Simulation of Individual User Behavior for Building Performance Predictions. In Proceedings of the Summer Computer Simulation Conference, San Diego, USA, pp. 913-920.

Rhys Goldstein, Alex Tessier, and Azam Khan, Space Layout in Occupant Behavior Simulation, Proceedings of Building Simulation 2011: 12th Conference of International Building Performance Simulation Association, Sydney, Nov. 14-16, pp. 1073-1080.

Chenda Liao and Prabir Barooah, An Integrated Approach to Occupancy Modeling and Estimation in Commercial Buildings, 2010 American Control Conference Marriott Waterfront, Baltimore, MD, USA Jun. 30-Jul. 2, 2010, pp. 3130-3135.

Extended European Search Report for Application No. 12822339.3 dated Feb. 12, 2015.

\* cited by examiner

Occupant 1

| Time | Task | | | | Duration | NPO |
|---|---|---|---|---|---|---|
| | Off | Work | Eat | Meet | | |
| 0:00 | x | | | | 9:00 | 1 |
| 1:00 | x | | | | | |
| 2:00 | x | | | | | |
| 3:00 | x | | | | | |
| 4:00 | x | | | | | |
| 5:00 | x | | | | | |
| 6:00 | x | | | | | |
| 7:00 | x | | | | | |
| 8:00 | x | | | | | |
| 9:00 | | x | | | 1:00 | 1 |
| 10:00 | | | | x | 1:00 | 5 |
| 11:00 | | x | | | 1:00 | 1 |
| 12:00 | | | x | | 2:00 | 4 |
| 13:00 | | | | x | | |
| 14:00 | x | | | | 3:00 | 1 |
| 15:00 | | x | | | | |
| 16:00 | | x | | | | |
| 17:00 | | x | | | | |
| 18:00 | x | | | | 6:00 | 1 |
| 19:00 | x | | | | | |
| 20:00 | x | | | | | |
| 21:00 | x | | | | | |
| 22:00 | x | | | | | |
| 23:00 | x | | | | | |

202

Occupant n

| Time | Task | | | | Duration | NPO |
|---|---|---|---|---|---|---|
| | Off | Work | Eat | Meet | | |
| 0:00 | x | | | | 10:00 | 1 |
| 1:00 | x | | | | | |
| 2:00 | x | | | | | |
| 3:00 | x | | | | | |
| 4:00 | x | | | | | |
| 5:00 | x | | | | | |
| 6:00 | x | | | | | |
| 7:00 | x | | | | | |
| 8:00 | x | | | | | |
| 9:00 | x | | | | | |
| 10:00 | | x | | | 1:00 | 1 |
| 11:00 | | | | x | 1:00 | 7 |
| 12:00 | | x | | | 2:00 | 1 |
| 13:00 | | x | | | | |
| 14:00 | | | x | | 1:00 | 4 |
| 15:00 | | x | | | 5:00 | 1 |
| 16:00 | | x | | | | |
| 17:00 | | x | | | | |
| 18:00 | x | | | | | |
| 19:00 | x | | | | | |
| 20:00 | x | | | | | |
| 21:00 | x | | | | | |
| 22:00 | x | | | | | |
| 23:00 | x | | | | | |

| Transition | 10 | 11 | 12 | 13 | 14 | 15 |
|---|---|---|---|---|---|---|
| off → off | | | | | | |
| off → work | 1 | | | | | |
| off → break | | | | | | |
| work → off | | | | | | 1 |
| work → work | | | | | | |
| work → break | | | 1 | | 2 | |
| break → off | | | | | | |
| break → work | | | | 1 | 1 | 1 |
| break → break | | | | | | |

| Transition | 10 | 11 | 12 | 13 | 14 | 15 |
|---|---|---|---|---|---|---|
| off → off | | | | | | |
| off → work | 1 | | | | | |
| off → break | | | | | | |
| work → off | | | | | | 1 |
| work → work | | | | | | |
| work → break | | | 0.33 | | | |
| break → off | | | | | | |
| break → work | | | | 1 | 1.5 | |
| break → break | | | | | 0.5 | 1 |

Fig. 6

$$\begin{bmatrix} \dfrac{a_{00}-\mu_0}{\sigma_0} - 1 \\ \dfrac{(a_{00}-\mu_0)^2}{\sigma_0^2} \\ \vdots \\ \dfrac{a_{i0}-\mu_i}{\sigma_i} - 1 \\ \dfrac{(a_{i0}-\mu_i)^2}{\sigma_i^2} \\ \vdots \\ \dfrac{a_{(m-1)0}-\mu_{m-1}}{\sigma_{m-1}} - 1 \\ \dfrac{(a_{(m-1)0}-\mu_{m-1})^2}{\sigma_{m-1}^2} \\ r_A \\ 0 \\ \vdots \\ 0 \end{bmatrix} \cdots \begin{bmatrix} \dfrac{a_{0j}-\mu_0}{\sigma_0} - 1 \\ \dfrac{(a_{0j}-\mu_0)^2}{\sigma_0^2} \\ \vdots \\ \dfrac{a_{ij}-\mu_i}{\sigma_i} - 1 \\ \dfrac{(a_{ij}-\mu_i)^2}{\sigma_i^2} \\ \vdots \\ \dfrac{a_{(m-1)j}-\mu_{m-1}}{\sigma_{m-1}} - 1 \\ \dfrac{(a_{(m-1)j}-\mu_{m-1})^2}{\sigma_{m-1}^2} \\ 0 \\ r_A \\ 0 \end{bmatrix} \cdots \begin{bmatrix} \dfrac{a_{0(n-1)}-\mu_0}{\sigma_0} - 1 \\ \dfrac{(a_{0(n-1)}-\mu_0)^2}{\sigma_0^2} \\ \vdots \\ \dfrac{a_{i(n-1)}-\mu_i}{\sigma_i} - 1 \\ \dfrac{(a_{i(n-1)}-\mu_i)^2}{\sigma_i^2} \\ \vdots \\ \dfrac{a_{(m-1)(n-1)}-\mu_{m-1}}{\sigma_{m-1}} - 1 \\ \dfrac{(a_{(m-1)(n-1)}-\mu_{m-1})^2}{\sigma_{m-1}^2} \\ 0 \\ \vdots \\ 0 \\ r_A \end{bmatrix}$$

702

$$\begin{bmatrix} w_0 & \cdots & w_j & \cdots & w_{n-1} \end{bmatrix}$$

706

$$= \begin{bmatrix} 0 & 0 & \cdots & 0 & 0 & \cdots & 0 & 0 & r_A & \cdots & r_A & \cdots & r_A \end{bmatrix}$$

METHOD AND SYSTEM FOR GENERATING OCCUPANT SCHEDULES

BACKGROUND OF THE INVENTION

Field of the Invention

Embodiments of the present invention generally relate to the modeling of building occupant behavior.

Description of the Related Art

Buildings consume vast amounts of energy. Some estimate that they account for 72% of electricity use in the US. It has been suggested that appropriate design improvements, selected with the aid of decision-support software, could reduce energy use by about 30% in existing buildings and 50% to 75% in new buildings. This is the motivation for building performance simulation. The idea is to model a building's many interacting subsystems, including its occupants, electrical equipment, and indoor and outdoor climate. With simulation results in hand, an architect is better able to predict the energy demand associated with various designs and can choose from among the more sustainable options.

A building's energy consumption patterns depend largely on the behavior of the people that occupy it, a fact observed by comparing the timing of daily activities with profiles of energy use. Many existing building performance simulation tools use fixed schedules to account for the presence of occupants but such schedules do not yield realistic results.

As the foregoing illustrates, there is a need in the art for a more detailed and realistic occupancy models for accurate energy demand predictions.

SUMMARY OF THE INVENTION

An embodiment of the present invention relates to a method for generating interdependent schedules in an occupant simulation model. In this embodiment of the invention, a plurality of schedules are generated having various activities. Within the generated schedules may be included activities that require the attendance of other occupants. Whereas prior art methods have not accounted for interdependent activities and schedules, disclosed herein are methods for distributing multi-occupant activities among other occupants of a building. In this way, the schedules obtained in accordance with the present invention are more realistic.

In another embodiment of the present invention, personas are used to generate simulated occupant schedules from a limited number of real-world occupant schedules. Characteristics of the real-world schedules are manipulated so as to fit desired characteristics. For example, whereas the real-world schedules may have certain statistics associated with them, an embodiment of the present invention can steer such characteristics to meet desired attributes. For example, attributes such as arrival and departure times can be made to fit within predetermined intervals. Many simulated schedules can be generated from a small number of real-world schedules where the simulated schedules exhibit desirable real-world characteristics. In other embodiments of the invention, different persona models are disclosed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 shows various schedules as generated and used in embodiments of the present invention.

FIG. 3 shows a histogram as generated and used in embodiments of the present invention.

FIG. 6 shows a modified histogram as generated and used in embodiments of the present invention.

FIG. 7 shows an expansion of the matrix equation $A \cdot W = B$ used in certain embodiment of the present invention in order to obtain weights from schedules and an artificial persona weighting coefficients.

DETAILED DESCRIPTION

Figure 1:
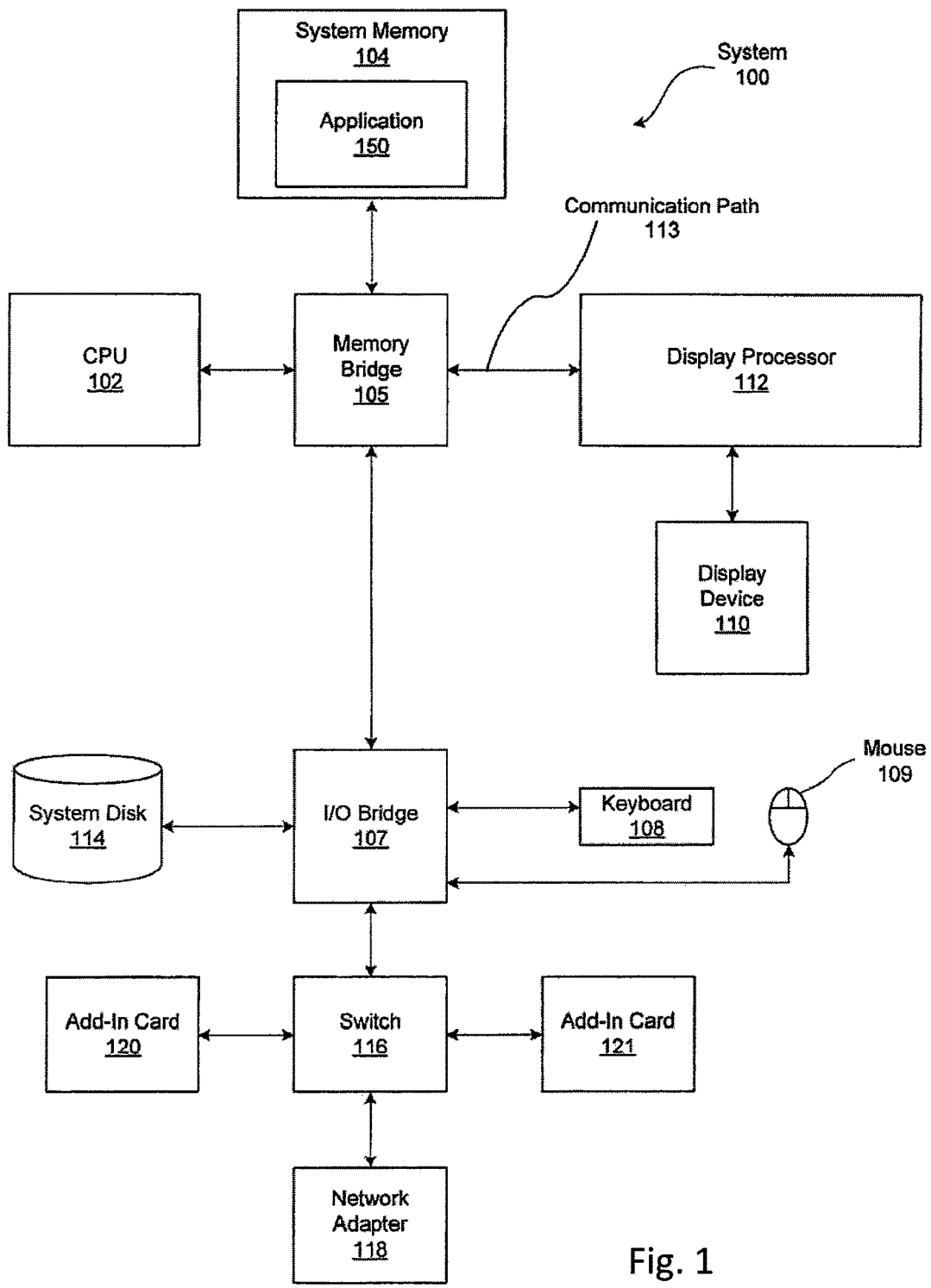
FIG. 1 is a block diagram of a computer system on which certain embodiments of the present invention can be implemented.

Among other things, the present invention relates to methods, techniques, and algorithms that are intended to be implemented in a digital computer system. By way of overview that is not intended to be limiting, digital computer system 100 as shown in FIG. 1 will be described. Such a digital computer or embedded device is well-known in the art and may include variations of the below-described system.

FIG. 1 is a block diagram of a system 100 configured to implement one or more aspects of the present invention. System 100 may be a computer workstation, personal computer, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation; CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface (GUI) on display device 110. Application 150 may be configured to generate and modify documents based on input received from a user. For example, application 150 may be a word processing application or an image editing program.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Among other things, embodiments of the present invention introduce personas, descriptions of fictional individuals used in the field of human-computer interaction, into a simulation of building performance. With modern trends in energy and resource conservation, a goal of the present invention is to reduce the impact of buildings on the environment by helping architects predict the energy demand associated with different design options.

The present invention generally relates to methods and techniques for simulating the behavior of individual building occupants. The methods and techniques of the present invention advantageously allow occupants to interact with one another to produce realistic simulations. In another embodiment, the present invention uses personas to customize and diversify occupant behavior. Occupant interaction and behavior customization were achieved by way of the assignment of weighting coefficients to activities used for model calibration. Simulation results demonstrate that, by supplying only certain information, the present invention can generate interdependent schedules specifically tailored to identified projects.

In an embodiment, a method of the present invention generates sets of schedules for a predetermined number of building occupants. The schedules feature occupant interaction and other attributes. For example, if an office meeting or social gathering appears in the schedule of one occupant, it will also appear in the schedules of other participating occupants. Also, the behavior represented in the schedules can be customized. For example, occupant interaction and behavior customization are achieved using a mathematical technique described below. In this technique, the assignment of weighting coefficients to the schedules and activities used for model calibration.

In an embodiment of the invention, an occupant schedule is a list of consecutive activities that describe the behavior of a building occupant over the course of a single day. Example of an occupant schedules 202 and 204 are shown in FIG. 2. For purposes of the example shown in FIG. 2, activities are limited to Off (meaning that an occupant is out of the building), Work (meaning that the occupant is working individually in the building), Eat (meaning that the occupant is eating a meal individually), and Meet (meaning the occupant is participating in a multi-person meeting). Other embodiments of the invention include many more tasks as may be performed by a building occupant. For a given activity, the example of FIG. 2 includes two attributes. Duration is the amount of time that an activity will last. This information along with the known start time also sets the end time. For a multi-person meeting, the attribute $n_{PO}$ specifies the number of participating occupants. Many more activities are possible without deviating from the teachings of the present invention. For example, activities can include in_office, in_hallway, or in_conference_room to indicate work activities that may be performed in various parts of a building. Likewise, many more attributes are possible without deviating from the teachings of the present invention. For example, attributes for an activity can include resource_used, quantity_of_resource, duration_of_use, among other things. Such attributes can be useful in modeling electrical usage, water usage, or even the use of paper in copiers and printers. These and many more variations of the present invention will be understood by those of ordinary skill in the art upon an understanding of the present disclosure.

In modeling the use of a building, it is desirable to model the behavior of its occupants. One method for doing so is to build schedules for all the occupants of a building. Shown in FIG. 2 are schedules for two occupants of a building. As shown, for example, in schedule 202 for Occupant 1, he arrives to work at 9:00 AM and works in his office for one hour. He then goes on to attend a five-person meeting at 10:00 AM that lasts one hour. The activities for Occupant 1 continue until he leaves the building at 6:00 PM. Occupant n has a different schedule where such occupant arrives at 10:00 AM and leaves at 8:00 PM while performing Work, Eat, and Meet tasks as shown in schedule 204.

Described in the present disclosure is an occupant behavior simulation as schedule-calibrated if behavioral patterns found in the recorded schedules of building occupants are automatically reproduced in the generated schedules. Each schedule-calibrated method involves a model calibration phase during which histograms are populated using the activities of recorded schedules. For example, in the histogram 306 of FIG. 3, note that Activity #1, a transition from the off task to the work task occurring between 10:00 and 11:00, contributes a value of 1 to the off→work row and the column labeled 10. As shown in FIGS. 2 and 3, one-hour increments are used. In practice, multiple schedules could contribute to a given histogram. In practice also, it is desirable to use a finer resolution such as one-minute increments. Other embodiments can use even smaller time increments if desired.

Prior art schedule-calibrated methods have not properly accounted for multi-occupant interaction. For example, if a five-person meeting is generated in the schedule of one occupant, the same meeting should occur in the generated schedules of four other occupants. In the prior art, generated occupant schedules have been independent.

Prior art schedule-calibrated occupant behavior simulation methods also fail to provide easy-to-use mechanisms for customizing simulated behavior. Consider a scenario in which a client informs an architect that a future office building will accommodate different numbers of programmers, managers, marketers, and salespeople. Each type of occupant is expected to work different hours and favor different activities. This diverse yet project-specific behavior could be modeled by supplying schedules for calibration but would be prohibitively time-consuming.

In an embodiment of the invention, personas are implemented as developed for human-computer interaction (HCI). In an embodiment, a persona is a description of a fictional individual. In certain fields, personas are used to better understand product requirements by using fictional characters as future users. In other fields, a persona may be assigned a portrait, a name like "Max" or "Jane Roberts", and a 1-2 page description emphasizing personality traits and social/workrelated habits. And while personas are generally qualitative in nature, they can be reduced to sets of quantitative attributes and analyzed numerically. It is the use of quantitative personas that will be describe further below.

In an embodiment of the present invention, a schedule-calibrated method is described that accommodates interaction between simulated occupants. In one particular embodiment, only one additional input parameter is needed: the maximum number of building occupants N. Instead of generating each occupant schedule independently, a method of the present invention generates N schedules simultaneously.

Figure 4:
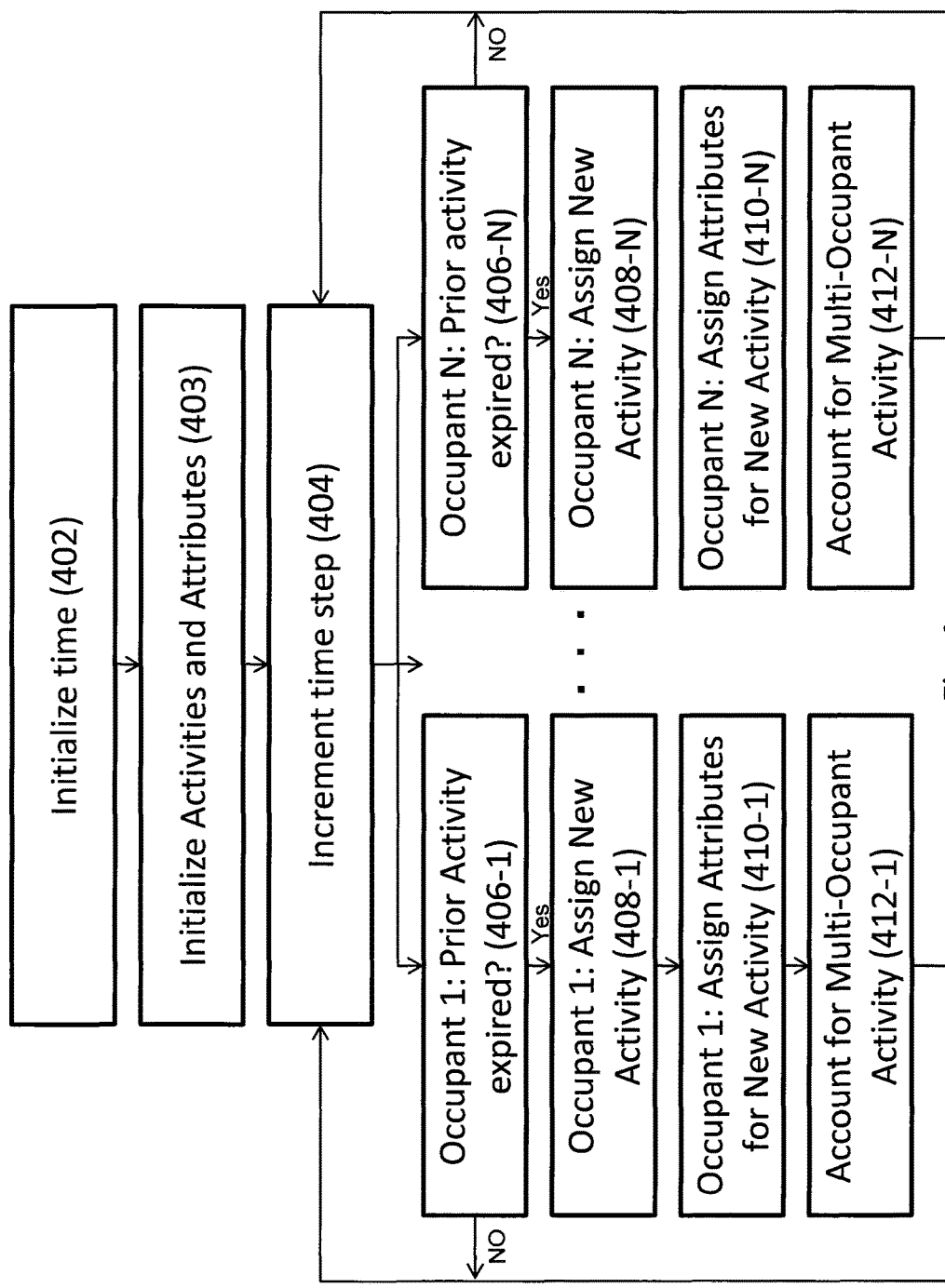
FIG. 4 is a flowchart of a method for generating interdependent schedules according to an embodiment of the present invention.
Figure 5:
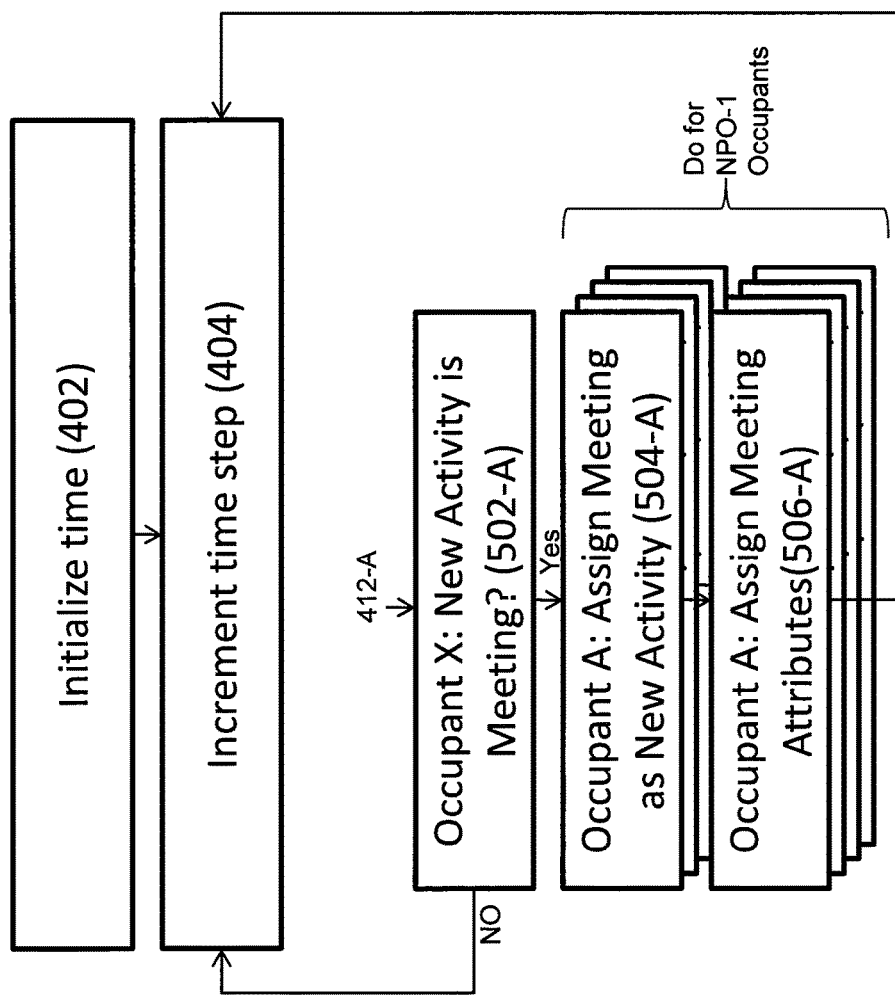
FIG. 5 is a flowchart of a method for generating interdependent schedules according to an embodiment of the present invention.

Shown in FIGS. 4 and 5 are methods for generating interdependent occupant schedules according to an embodiment of the invention. Although the method is described in conjunction with the various system representations set forth herein, persons skilled in the art will understand that any system that describes the method steps, in any order, falls within the scope of the present invention.

As shown in FIG. 4, at step 402, time is initialized. For example, in an embodiment of the invention time is initialized at 12:00 AM. Other initialization times are, of course, possible. At step 403, the activities of the N occupants of a building are initialized to Off, that is no one is in the building. Also, attributes for this first activity are set. In an embodiment, occupant attributes include Activity, Start_time, Duration, and Number_of_Participating_Occupants (also called $n_{PO}$ in the present disclosure). In the embodiment of FIG. 4 after the completion of step 403, all the occupants are outside of the building and their arrival time (e.g., the completion of the Off activity) is known. In other embodiments of the invention, start times can be randomly generated for the various occupants of the building as a time step is incremented (see step 404).

As shown in FIG. 4, at step 404 a time step is incremented and certain steps are implemented for the N occupants of a building. For example, for Occupant 1, a check is performed at step 406-1 to determine whether his prior activity has expired. If it has not, no further activity is performed for Occupant 1 until a next time step (see "No" branch from step 406-1. If, on the other hand, the prior activity has expired (see "Yes" branch from step 406-1), a new activity is assigned to Occupant 1 at step 408-1 and the attributes for such new activity are set at step 410-1. At step 412-1, an accounting is made of the new activity if it is a multi-occupant activity such as a meeting.

Steps 406-1 through 412-1 are repeated at each time step for Occupant 1. Likewise, similar steps are repeated for each occupant (see steps 406-N through 412-N for Occupant N).

For a multi-occupant activity such as a meeting, more details are provided for step 412 in FIG. 5. As shown in FIG. 5, where a new activity for Occupant A is a meeting, other participating occupants ($n_{PO}$) are also assigned the same meeting activity. For example, a first other participating occupant, Occupant A, is assigned the meeting as his new activity at step 504-A and the meeting attributes for Occupant A are assigned at step 506-A. Steps 504-$x$ and 506-$x$ are performed for a total of $n_{PO}$−1 other occupants. In the present description, Occupant A that initiated the meeting is called the initiator and the $n_{PO}$−1 other occupants that have the meetings altered are called the summoned occupants. The steps of 504-$x$ and 506-$x$ are likewise repeated for other occupants of a meeting (or other multi-occupant activity).

In an embodiment, new activities for occupants are randomly generated according to various probability distributions. These distributions can depend, for example, on values extracted from the histograms populated in the calibration phase as described herein.

In other embodiments of the invention, the manner of assigning a new activity to summoned occupants can be varied. For example, a one option is to apply the shared activity immediately to the summoned occupants. For example, the method prematurely terminates the current activities of all $n_{PO}$−1 summoned occupants, and appends the new shared activity to the $n_{PO}$−1 associated schedules. In this way, all $n_{PO}$ occupants begin the shared activity at the same time. In the case of an office meeting, all attendees would arrive at exactly the same time. Some might leave early, however, to attend other meetings through subsequent performance of steps 502-$x$ through 506-$x$ of FIG. 5.

Another option is to queue the shared activity. For example, each summoned occupant would transition to the shared activity only after the scheduled completion of his/her current activity. This option would allow participants to arrive late for a meeting, though all participants would leave the meeting at the same time.

To account for both planned and impromptu meetings, an embodiment of the invention implements a compromise between the two options described above. First, [$n_{PO}$/2] of the $n_{PO}$−1 summoned occupants are selected to abandon their current activities and immediately switch to the shared activity. The remaining summoned occupants complete their current activities and, thereafter, transition to the shared activity. With this approach, some occupants may arrive late to a meeting and some may leave early.

In the present invention, the frequency with which simulated occupants initiate shared activities reflects the frequency with which real occupants interact. But because an occupant can be summoned by other occupants, the frequency with which simulated occupants participate in shared activities can be overestimated if not properly accounted.

In an embodiment of the present invention, a solution is to reduce the probability of initiating an $n_{PO}$-person activity by a factor of $n_{PO}$. This is done by assigning a weighting coefficient of $1/n_{PO}$ to each activity in the recorded schedules used for calibration. These coefficients affect the histogram population procedure discussed previously. Table 602 presents the scaled histogram of table 306 as shown in FIG. 3. For example, because Activity 604 has 3 participating occupants, the value for activity 308 is scaled by ⅓. Similar adjustments are made for other multi-occupant activities.

This application of weighting coefficients reduces the rate at which simulated occupants initiate shared activities, compensating for the fact that they may be summoned to activities initiated by others. Further below in the present disclosure, different sets of non-negative weighting coefficients are introduced to influence behavior in other ways. In other embodiments, however, negative weighting coefficients may be implemented.

Personas will now be discussed in the context of building performance simulation as a way of customizing simulated behavior. In the HCI community, software designers introduce personas to better understand the habits of users of future computer applications. In a similar way, architects can use personas in accordance with the present invention to better predict occupant behavior in buildings.

In HCI, personas tend to be qualitative in nature. But in the present disclosure, quantitative personas are used. In the present invention, a persona is regarded as a set of quantitative persona attributes. To describe an office worker, for example, useful persona attributes include, among other things, arrival time, percentage of the day spent in meetings, and number of breaks taken each day.

In general, the more attributes a persona is given, the fewer real-world people it can reasonably represent. To broaden the scope of personas, in an embodiment of the invention, persona attributes are expressed as intervals rather than being strictly bounded. This allows the personas to be representative of more occupants of a building. For example, instead of stating that an occupant arrives at 09:00 A.M., spends 5% of the day in meetings, and takes 3 breaks each day, the present invention considers that he arrives between 08:45 and 09:15 A.M., spends 3% to 7% of the day in meetings, and takes 2 to 4 breaks. Each interval has an associated probability (e.g., "... arrives between 08:45 and 09:15, 80% of the time). Any particular application of the present invention, could vary these types of intervals as desired. A user of a simulation package that implements the present invention can readily understand the use of these intervals.

Mathematically, it is more convenient to parameterize each persona attribute with a mean value $\mu$ and a standard deviation $\sigma$. If $\mu$ and $\sigma$ are known, then the interval bounds $b_{lower}$ and $b_{upper}$ associated with a probability of p may be calculated from Equation 1 (shown below). Similarly, if the interval is known, $\mu$ and $\sigma$ from Equation 2 (shown below). $\Phi_{inv}$ is used to denote the inverse cumulative distribution function of a standard normal distribution. Other probability distributions can also be used.

$$b_{lower} = \mu - \Phi_{inv}\left(\frac{1+p}{2}\right) \cdot \sigma \quad (1)$$

$$b_{upper} = \mu + \Phi_{inv}\left(\frac{1+p}{2}\right) \cdot \sigma$$

$$\mu = \frac{b_{lower} + b_{upper}}{2} \quad (2)$$

$$\sigma = \frac{b_{upper} - b_{lower}}{2 \cdot \Phi_{inv}\left(\frac{1+p}{2}\right)}$$

Figure 10:
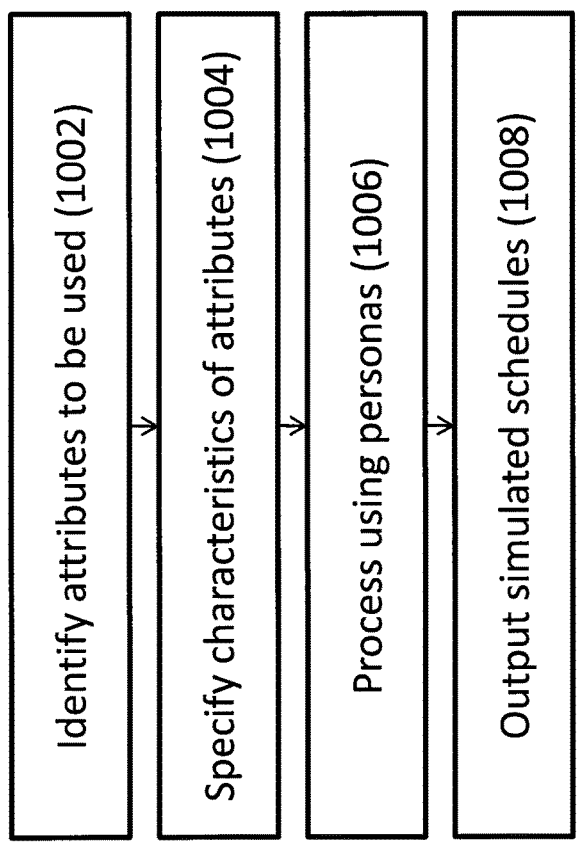
FIG. 10 is a flowchart for a method according to an embodiment of the invention for using personas to generate simulated schedules.

Shown in FIG. 10 is a method according to an embodiment of the invention for using personas to generate simulated occupant schedules. Although the method is described in conjunction with the various system representations set forth herein, persons skilled in the art will understand that any system that describes the method steps, in any order, falls within the scope of the present invention.

As shown in FIG. 10, a user of a software package that implements the present invention can be provided with a choice of attributes that are to be used for generating the simulated schedules. As described above, attributes can include, among other things, arrival time, percentage of the day spent in meetings, and number of breaks taken each day. Many more attributes can be used in accordance with the present invention without deviating from its teachings.

At step 1004, a user of a software package that implements the present invention can specify characteristics associated with the various attributes that are to be used. For example, as described above, the characteristics of the attributes can be specified as intervals. A software package can then use these intervals to generate desired statistical parameters such as the mean and standard deviation of a probability distribution. Alternatives to specifying intervals can also be implemented. For example, instead of specifying a range that bounds an attribute, other characteristics can be specified. For example, a mean and standard deviation of a probability distribution can be specified. Moreover, the type of probability distribution can also be specified (e.g., normal distribution, uniform distribution, exponential distribution, etc.).

As shown in FIG. 10, this embodiment of the present invention processes the provided information at step 1006 according to a predetermined persona to generate simulated schedules at step 1008. The method of FIG. 10 can be implemented a multitude of times to generate a plurality of simulated schedules as desired.

The manner of constructing the personas of the present invention will now be discussed. Two types of personas are disclosed: (i) inferred personas and (ii) artificial personas. Variations and combinations of these personas are also within the scope of the present invention.

Figure 11:
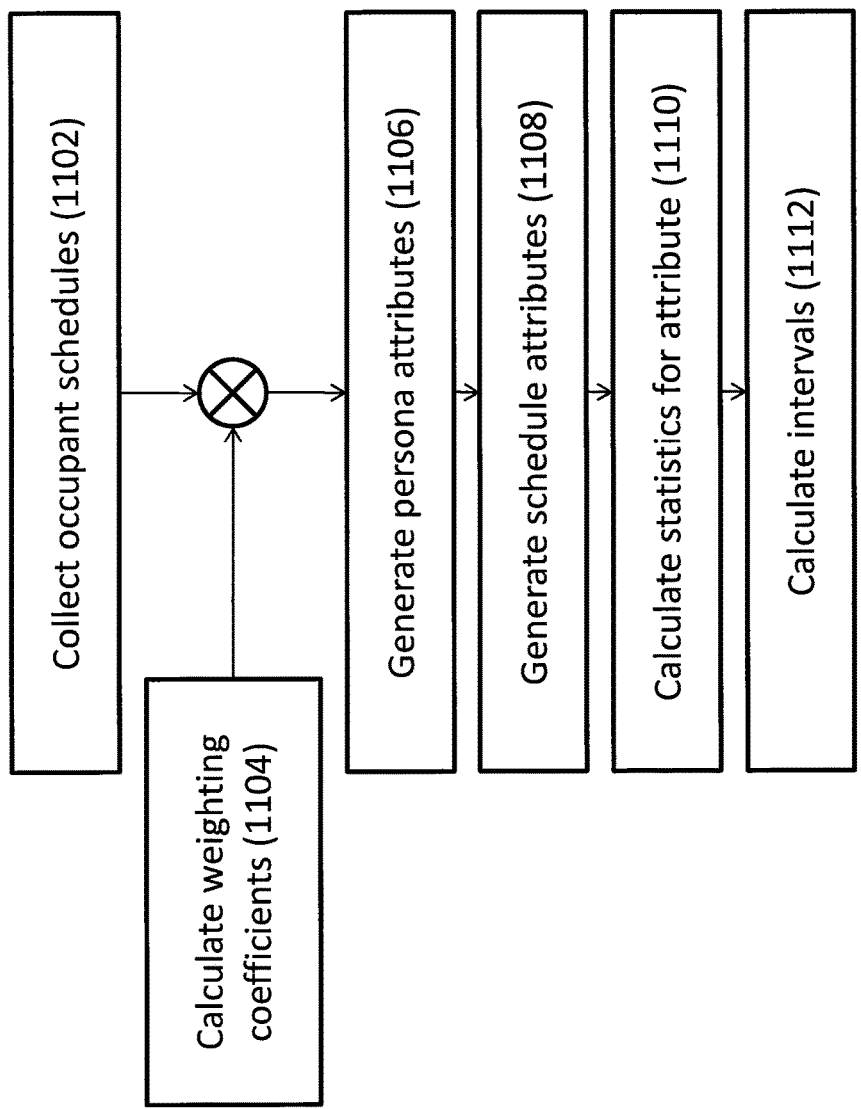
FIG. 11 is a flowchart for a method according to an embodiment of the invention for creating an inferred persona.

Shown in FIG. 11 is a method for constructing an inferred persona according to an embodiment of the present invention. In the case of an inferred persona, m persona attributes are generated at step 1106 from n occupant schedules that are collected at step 1102 and their associated weighting coefficients that are calculated at step 1104. Recall that a weighting coefficient pertains to a single activity and that there are several activities in an occupant schedule. An embodiment of the present invention uses a single weight for each schedule. Therefore, for each occupant schedule j (meaning the schedule identified by the integer j; j=0, 1, . . . , n−1), the weight $w_j$ (at step 1104) is calculated by averaging the weighting coefficients of the schedule's activities.

Continuing this persona inference procedure, the next step is to generate a separate schedule attribute $a_{ij}$ for each persona attribute i and occupant schedule j at step 1108. The derivation of $a_{ij}$ depends on the type of persona attribute. For example, if the attribute quantifies an office worker's arrival time, $a_{ij}$ is assigned the time between midnight and the first office activity of the day. If the persona attribute is the percentage of time spent in meetings, then $a_{ij}$ is calculated by dividing the accumulated time spent in meetings by the time elapsed between arrival and departure times.

After n weights $w_j$ and all m·n schedule attributes $a_{ij}$ are obtained, certain statistics are calculated at step 1110. In an embodiment, the mean value $\mu_i$ and standard deviation $\sigma_i$ for each persona attribute i are calculated. In an embodiment, this can be done by evaluating $n_w$ using Equation 3, then obtaining each $\mu_i$ and $\sigma_i$ using Equations 4 and 5.

$$n_w = \sum_{j=0}^{n-1} w_j \quad (3)$$

$$\mu_i = \frac{1}{n_w} \cdot \sum_{j=0}^{n-1} w_j \cdot a_{ij} \quad (4)$$

$$\sigma_i = \sqrt{\frac{1}{n_w} \cdot \sum_{j=0}^{n-1} w_j \cdot (a_{ij} - \mu_i)^2} \quad (5)$$

The inferred persona is completed by applying Equation 1 for each persona attribute to calculate the corresponding interval at step 1112.

In an embodiment, the probability p can, in some cases, be adjusted to yield a more reasonable interval. Consider, for example, the situation where an arbitrarily selected p of 80% yielded an interval of −2 (negative two) to 5 breaks per day. In order to avoid the negative number, breaks may instead be limited 0 to 3 breaks with a recalculated p of 42%.

The persona generated according to the method of FIG. 11 can then be used according to the method of FIG. 10 to generate simulated schedules that can then be used in the usage of a building. The persona generated according to the method of FIG. 11 can be used in conjunction with the method of FIG. 10 to generate a number of simulated schedules as desired.

The manner of creating an artificial persona in order to generate fictional schedules will now be discussed. Note that the present invention does not discard schedule-calibrated methods because the inclusion of recorded schedules alleviates the need to obtain all behavioral information from user-supplied personas. In a case where recorded behavior contradicts an artificial persona attribute, however, it is the attribute that should govern the behavior of the simulated occupant.

In order to solve the present customization problem, the matrix equation A·W=B as shown in FIG. 7 is used. As shown, matrices A 702 and B 704 are known, and a solution will be found for the vector W 706. Moreover, W 706 includes the weights obtained from schedules and artificial persona weighting coefficients.

Figure 12:
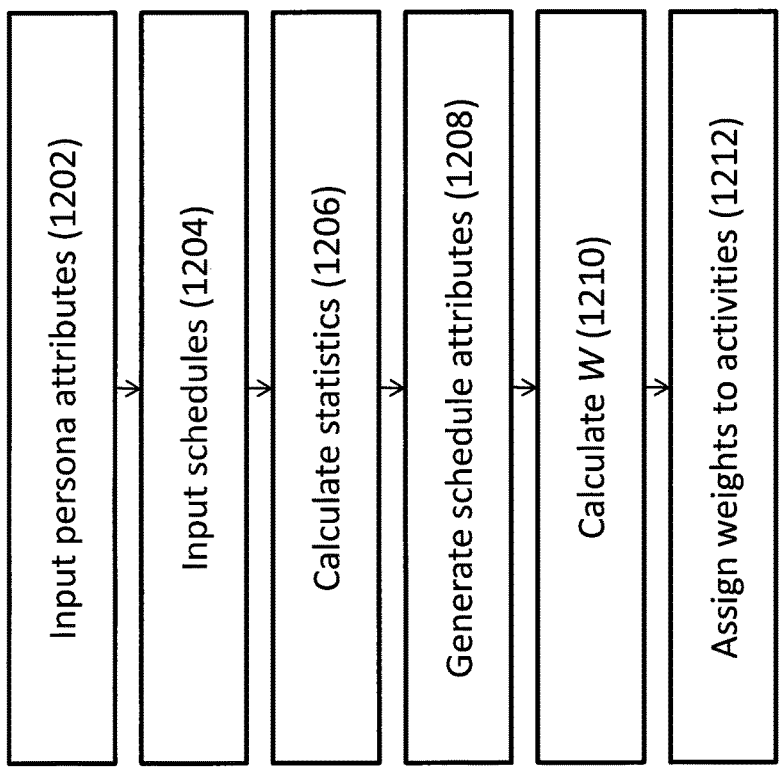
FIG. 12 is a flowchart for a method according to an embodiment of the invention for creating an artificial persona.

Shown in FIG. 12 is a method for constructing an artificial persona according to an embodiment of the present invention. Although the method is described in conjunction with the various system representations set forth herein, persons skilled in the art will understand that any system that describes the method steps, in any order, falls within the scope of the present invention.

Whereas persona inference entails the use of n schedules and n weights to calculate m persona attributes, the method of FIG. 12 for constructing an artificial persona is provided m persona attributes and n schedules with which to obtain n weights. As will be shown, the method of FIG. 12 steers the simulated behavior toward that of a desired artificial persona.

As shown, m persona attributes are input at step 1202 and n schedules are input at step 1204. In an embodiment of the invention, certain of the persona attributes can be specified as intervals. In such an embodiment, as shown in FIG. 12, the statistics $\mu_i$ and $\sigma_i$ are calculated at step 1206 for each persona attribute i using Equation 2. At step 1208, schedule attribute are generated as described above for persona inference (see step 1108 of FIG. 11).

At this point the weights $w_j$ and their sum $n_w$ are unknown. Mathematically, $n_w$ is eliminated from Equations 4 and 5 by substitution using Equation 3. Further manipulation yields Equations 6 and 7.

$$\sum_{j=0}^{n-1} \frac{a_{ij} - \mu_i}{\sigma_i} \cdot w_j = 0 \quad (6)$$

$$\sum_{j=0}^{n-1} \left( \frac{(a_{ij} - \mu_i)^2}{\sigma_i^2} - 1 \right) \cdot w_j = 0 \quad (7)$$

The Equations 6 and 7 can then be expressed as matrix equations of the form A·W=B as shown in FIG. 7. The further constraint of Equation 8 is included so as to avoid the trivial exact solution $W=0_n$ (i.e., the vector W containing the unknown weights $w_j$ and $0_n$ being a vector of n zeros).

$$r_A \cdot w_j = r_A \quad (8)$$

With m equations given by Equation 6, another m given by Equation 7, and an additional n given by Equation 8, 2·m+n equations are available for n unknowns. For this over specified situation, a least squares solution is implemented for calculating W at step 1210 in the method of FIG. 12. Note, however, that other solutions as known in the art could also be implemented.

Note that a large value of $r_A$ emphasizes Equation 8. These n equations, which imply that $w_j=1$ for all j, steer the simulated behavior towards that found in the schedules. Conversely, small values of $r_A$ favor the persona. In certain applications, it has been observed that there can be a large discrepancy between the schedules and the artificial persona. In these situations, it is safest to use a large $r_A$ in order to discourage variability in the weights. In an embodiment of the invention, Equation 9 is used, which quantifies this discrepancy. Note that $A_{2\cdot m}$ is the top 2·m-by-n submatrix of A, and $B_{2\cdot m}$ is the top 2·m-element subvector of B.

$$r_A = \|A_{2\cdot m} \cdot 1_n - B_{2\cdot m}\| \quad (9)$$

The least squares solution as calculated in step 1210 is the W that minimizes $\|A\cdot W-B\|$. Note that the standard solution neglects the fact that, in one embodiment, the weights should be non-negative. In an embodiment W is obtained using the Fast Non-Negativity-Constrained Least Squares Algorithm (FNNLS) of Bro and Jong (1997), which guarantees $w_j \geq 0$ for all j. Small values of r from Equation 10 suggest a successful fit.

$$r = \|A_{2\cdot m} \cdot W - B_{2\cdot m}\| \quad (10)$$

With W in hand, every activity of each schedule j can be assigned $w_j$ as a weighting coefficient as shown in step 1212 of FIG. 12. If the n schedules and the new weighting coefficients are used in the model calibration phase, the resulting simulated behavior reflects both the schedules and the artificial persona.

The persona generated according to the method of FIG. 12 can then be used according to the method of FIG. 10 to generate simulated schedules that can then be used in the usage of a building. The persona generated according to the method of FIG. 12 can be used in conjunction with the method of FIG. 10 to generate a number of simulated schedules as desired.

In an embodiment of the invention, occupant interaction and behavior customization are combined into a single multiple-occupant simulation method. This method was tested by collecting behavioral data and implementing a prototype in C++.

Figure 8:
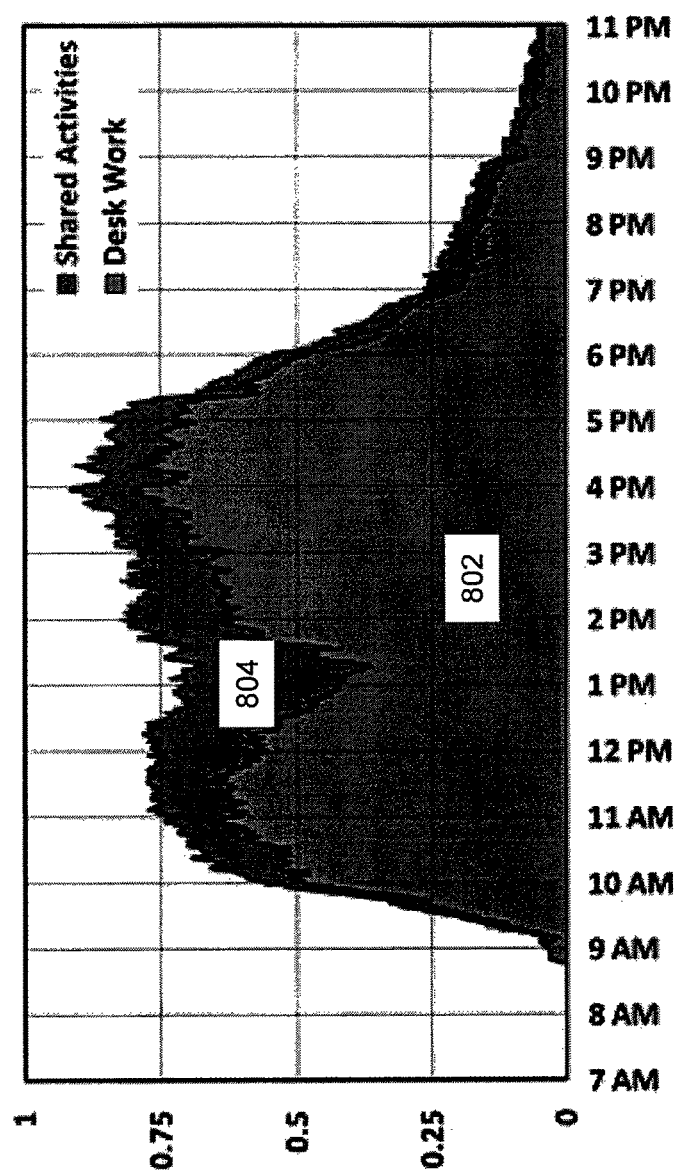
FIG. 8 shows the certain activity profiles based on recorded schedules according to an embodiment of the invention.

This embodiment of the present invention uses a set of recorded occupant schedules. For testing purposes, a total of 121 schedules were gathered from six researchers who tracked their own activities in an office environment. Each schedule resembled the schedules of FIG. 2 with finer resolution. In this embodiment, tasks were limited to off, desk work, desk meeting, team meeting, tech visit (e.g., using the printer), washroom break, onsite break, and offsite break. FIG. 8 shows the probability that an occupant is working at their desk (lower region 802) and engaging in shared activities with other occupants (upper region 804) throughout the day based on the 121 schedules that were used.

In application recorded schedules can be packaged with simulation software and reused. The set of personas and the number of occupants for each persona can, however, be specified on a per-project basis.

The fictional building described here included 100 occupants and 3 personas: (i) 50 occupants for Persona X, (ii) 40 for Persona Y, and (iii) 10 for Persona Z. Instead of artificially creating Persona X, its six persona attributes (m=6) were inferred from the recorded schedules. Below, p=50% for the desk meeting interval and 80% elsewhere.

Persona X (Inferred from Input Data)
  . . . arrives between 08:26 and 12:30
  . . . leaves between 15:29 and 21:44
  . . . spends 0.0% to 14.7% of the day in desk meetings
  . . . has a 19.8% chance of meeting with the team
  . . . takes a break onsite 0.2 to 3.2 times per day
  . . . has a 51.2% chance of taking a break offsite For the persona attributes pertaining to team meetings and offsite breaks, the probabilities listed are the mean values $\mu$. The intervals and standard deviations are redundant for these attributes, as $\sigma = \mu \cdot (1-p)$. As for the schedule attributes, $a_{ij}=1$ if schedule j includes any team meeting/offsite break, and 0 otherwise.

Both Persona Y and Persona Z were artificially created. Note the differences between the behavior specified below for Persona Z, and that inferred from the recorded schedules.

Persona Z (Artificially Created)
  . . . arrives between 10:00 and 11:00
  . . . leaves between 18:00 and 21:00
  . . . spends 10.0% to 20.0% of the day in desk meetings
  . . . has a 40.0% chance of meeting with the team
  . . . takes a break onsite 1.0 to 3.0 times per day
  . . . has a 20.0% chance of taking a break offsite Before simulating interacting occupants, a set of $n_{ind}$ independent schedules are generated for each persona. A value of $n_{ind}=10000$ was used, generating the Persona X schedules with a schedule-calibrated method.

For each artificial persona like Y and Z, behavior was first customized by generating n independent schedules, constructing the matrices of FIG. 7, and solving for W. A value of n=400. If there is a significant discrepancy between the n schedules and an artificial persona, a single application of the FNNLS algorithm may not be sufficient. In this situation, the customization procedure can be repeated several times. On each iteration, the current W is used to generate a new set of n schedules, which in turn yields an updated W. The value of r tends to decrease with each iteration as each successive set of n schedules better reflects the persona. The iterations were terminated when $r \leq 0.1$. In the present example, three iterations were used for both Persona Y and Persona Z. Final sets of weights are used to generate the sets of $n_{ind}$ schedules.

For each persona, $n_{ind}$ independent schedules are available from which to calibrate a separate activity generator. It is at this point that the occupant interaction weighting scheme is applied where each $n_{PO}$-person activity is given a coefficient of $1/n_{PO}$. When an occupant's current activity expires during a simulation, the activity generator associated with his persona produces the next activity.

The final challenge is to allow occupants of multiple personas to be summoned to the same shared activity yet preserve the behavior in the independent schedules. In this embodiment, all sets of $n_{ind}$ schedules are used to calibrate a single participant generator. Whenever an activity generator outputs a shared activity, the participant generator calculates the proportion of the summoned occupants to allocate to each persona. All four activity attributes (time of day, task, $n_{PO}$, duration) are used as factors, and there is one feature for each persona. A set of normalized feature values gives the distribution of personas among activity participants.

In applications of the present invention relatively few occupants of a particular persona, such occupants may be summoned to a disproportionately high number of shared activities. In this situation, an appropriate set of weighting coefficients addresses this issue. Recall that the participant generator is calibrated with $n_{ind}$ schedules of each persona. Each set of $n_{ind}$ schedules is weighted with the overall fraction of occupants sharing the corresponding persona. In a prototype, for example, the coefficients for the three personas were 0.5, 0.4, and 0.1.

Figure 9:
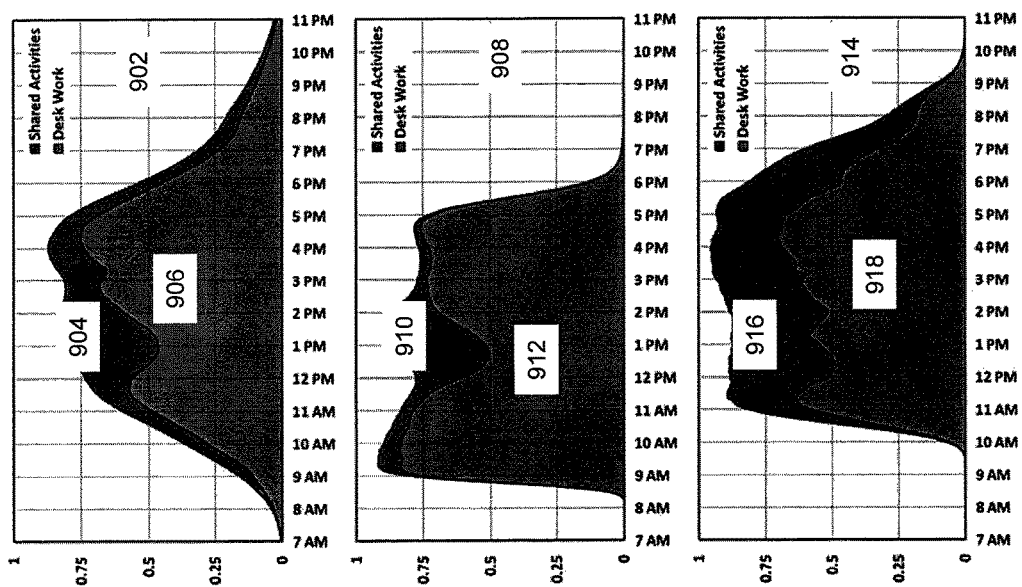
FIG. 9 shows certain activity profiles of three personas as accumulated from 100,000 schedules generated according to an embodiment of the invention.

The behavior of the 100 interacting occupants was simulated over a 24-hour period for 1000 times. The activity data accumulated from the 100,000 resulting schedules was used to create the profiles in FIG. 9. FIG. 9 shows the activity profiles based on the simulated behavior for Personas X (graph 902, shared activities 904, desk work 906), Y (graph 908, shared activities 910, desk work 912), and Z (graph 914, shared activities 916, desk work 918).

From a qualitative point of view, the results are as expected. The simulated Persona X profiles of FIG. 9 resemble those of the recorded schedules in FIG. 8. Persona Y was designed to exhibit an early schedule and relatively few shared activities, and this behavior is reflected in FIG. 9. Similarly, the profiles for Persona Z are consistent with the artificial attributes, exhibiting a later schedule and a greater prevalence of shared activities. A sample of the generated schedules was also inspected, looking at each activity. The schedules appeared reasonable.

To quantitatively validate the customization technique, personas were inferred from the 10000 ($n_{ind}$) independent schedules. To validate the occupant interaction technique, personas were also inferred from the schedules of the interacting occupants. Shown below is the artificial version of Persona Y, following by the two inferred versions. The desk meeting intervals have probabilities of 68% for the independent simulated occupants and 42% for the interacting occupants. For all other attributes, p=80%.

Persona Y (Artificially Created)
. . . arrives between 08:30 and 09:00
. . . leaves between 17:00 and 18:00
. . . spends 0.0% to 4.0% of the day in desk meetings
. . . has a 10.0% chance of meeting with the team
. . . takes a break onsite 0.0 to 2.0 times per day
. . . has a 60.0% chance of taking a break offsite Persona Y (Independent Simulated Occupants)
. . . arrives between 08:29 and 09:00
. . . leaves between 16:54 and 18:11
. . . spends 0.0% to 3.8% of the day in desk meetings
. . . has a 12.3% chance of meeting with the team
. . . takes a break onsite 0.0 to 2.0 times per day
. . . has a 59.1% chance of taking a break offsite Persona Y (Interacting Simulated Occupants)
. . . arrives between 08:30 and 09:00
. . . leaves between 16:56 and 18:11
. . . spends 0.0% to 4.9% of the day in desk meetings
. . . has a 14.3% chance of meeting with the team
. . . takes a break onsite 0.0 to 2.1 times per day
. . . has a 63.3% chance of taking a break offsite Note the agreement between the artificial version of Persona Y and the version inferred from the independently generated schedules. Although there are differences between the two sets of intervals, these differences are less than the discrepancy expected between predicted and actual occupant behavior. Because a similar level of agreement was achieved for Persona Z, there is confidence in the customization aspect of the methods of the present invention.

Similarities between the two inferred versions of Persona Y indicate that occupant interaction was introduced without severely altering behavioral patterns. It is worth noting, however, that the prevalence of shared activities is consistently higher in the version with occupant interaction. The most prominent discrepancy occurred in the team meeting attribute of Persona Z; with an artificial probability of 40%. The independent schedules yielded 40.4%, but with interaction, the result was 59.4%. For every other attribute, this bias was observable but reasonable.

With the methods of the present invention, architects, or other users of simulation tools, benefit from provided recorded schedules. The present invention, with the input of a few persona attributes or even no attributes, can also produce realistic behavior.

In a workflow that implements the present invention, at the beginning of a project, an architect, or other user of simulation tools, would select two parameters: the type of building (e.g., office building, household, shopping mall) and the total number of occupants. The simulation software would then produce realistic simulated behavior using the tasks and recorded schedules provided for the selected building type. In a further workflow, in order to account for differences between company workers, ages, genders, or cultural traits, personas would be added. This could be done gradually. As an architect designs floor plans and selects specific materials, for example, his model might expand from zero personas to a few personas with a few attributes each to perhaps a dozen detailed personas. At a later stage in the design process, for example, he may then include personas for occasional guests or office workers who may be modeled as typically working from home.

In the present disclosure methods and techniques have been described for simulating the interaction of occupants of a building. In embodiments of the present invention, architects or other users of simulation tools can create fictional occupant schedules specifically tailored to their own projects.

While the foregoing is directed to embodiments of the present invention, other and further embodiments of the invention may be devised without departing from the basic scope thereof, and the scope thereof is determined by the claims that follow.

The invention claimed is:

1. A method for generating schedules for occupants of a building, comprising:
   receiving an identification of a first set of activities that can be assigned to a first occupant and a second occupant of a building, wherein one or more attributes are associated with each activity in the first set of activities;
   for each of the one or more attributes, receiving one or more parameters for bounding a variability of the one or more attributes for determining an interval range for the one or more attributes, wherein at least one attribute comprises a start time, an arrival time, an end time, a departure time, a number of breaks in a day, or a percentage of time spent performing an activity in a day that is represented by an interval range having an associated probability p, wherein for the at least one attribute, the interval range boundaries $b_{lower}$ and $b_{upper}$ of the associated probability p is determined from a mean value $\mu$ and a standard deviation $\sigma$ of the at least one attribute using the equation:

$$b_{lower} = \mu - \Phi_{inv}\left(\frac{1+p}{2}\right) \cdot \sigma$$

$$b_{upper} = \mu + \Phi_{inv}\left(\frac{1+p}{2}\right) \cdot \sigma,$$

wherein $\Phi_{inv}$ denotes an inverse cumulative distribution function of a standard normal distribution;
   generating, via a processor, a first occupant model that includes the first set of activities and the one or more attributes associated with each activity in the first set of activities;
   assigning a first activity to the first occupant according to the first occupant model, wherein the first activity is chosen from the first set of activities;
   assigning, for the first occupant, one or more first values to the one or more attributes of the first activity according to the first occupant model;
   assigning the first activity to the second occupant according to the first occupant model; and
   assigning, for the second occupant, one or more second values to the one or more attributes of the first activity according to the first occupant model, wherein the one or more second values are different than the one or more first values to the one or more attributes of the first activity.

2. The method of claim 1, wherein generating the first occupant model includes the steps of
   collecting a first predetermined number of survey schedules;
   calculating weighting coefficients for the first predetermined number of survey schedules, wherein the weighting coefficients transform statistics of the survey schedules to conform to the one or more parameters for bounding a variability of the one or more attributes.

3. The method of claim 2, wherein the first predetermined number of survey schedules are obtained from a survey of occupants of a real-world building.

4. The method of claim 2, wherein the weighting coefficients are calculated to be positive numbers only.

5. The method of claim 1, wherein the one or more parameters for bounding a variability of the one or more attributes determine a mean and standard deviation for a probability of assigning the first set of activities.

6. The method of claim 1, wherein the one or more parameters for bounding a variability of the one or more attributes determine a mean and standard deviation for a probability of assigning the one or more first values and the one or more second values to the one or more attributes of the first activity.

7. The method of claim 1, wherein generating the first occupant model includes the steps of
   generating a first predetermined number of artificial schedules that include the first set of activities and the one or more attributes associated with each activity in the first set of activities;
   calculating weighting coefficients for the first predetermined number of artificial schedules, wherein the weighting coefficients transform statistics of the survey schedules to conform to the one or more parameters for bounding a variability of the one or more attributes.

8. The method of claim 6, wherein the weighting coefficients are calculated using a least squares algorithm.

9. The method of claim 6, wherein the weighting coefficients are calculated to be non-negative numbers only.

10. A non-transitory computer-readable medium including instructions that, when executed by a processing unit, cause the processing unit to generate schedules for individuals that are occupants of a building, by performing the steps of:
    receiving an identification of a first set of activities that can be assigned to a first occupant and a second occupant of a building, wherein one or more attributes are associated with each activity in the first set of activities;
    for each of the one or more attributes, receiving one or more parameters for bounding a variability of the one or more attributes for determining an interval range for the one or more attributes, wherein at least one attribute comprises a start time, an arrival time, an end time, a departure time, a number of breaks in a day, or a percentage of time spent performing an activity in a day that is represented by an interval range having an associated probability p, wherein for the at least one attribute, the interval range boundaries $b_{lower}$ and $b_{upper}$ of the associated probability p is determined from a mean value $\mu$ and a standard deviation $\sigma$ of the at least one attribute using the equation:

$$b_{lower} = \mu - \Phi_{inv}\left(\frac{1+p}{2}\right) \cdot \sigma$$

$$b_{upper} = \mu + \Phi_{inv}\left(\frac{1+p}{2}\right) \cdot \sigma,$$

wherein $\Phi_{inv}$ denotes an inverse cumulative distribution function of a standard normal distribution;
    generating, via a processor, a first occupant model that includes the first set of activities and the one or more attributes associated with each activity in the first set of activities;
    assigning a first activity to the first occupant according to the first occupant model, wherein the first activity is chosen from the first set of activities;
    assigning, for the first occupant, one or more first values to the one or more attributes of the first activity according to the first occupant model;
    assigning the first activity to the second occupant according to the first occupant model; and assigning, for the second occupant, one or more second values to the one or more attributes of the first activity according to the first occupant model, wherein the one or more second values are different than the one or more first values to the one or more attributes of the first activity.

11. The non-transitory computer-readable medium of claim 10, wherein generating the first occupant model includes the steps of
collecting a first predetermined number of survey schedules;
calculating weighting coefficients for the first predetermined number of survey schedules, wherein the weighting coefficients transform statistics of the survey schedules to conform to the one or more parameters for bounding a variability of the one or more attributes.

12. The non-transitory computer-readable medium of claim 11, wherein the first predetermined number of survey schedules are obtained from a survey of occupants of a real-world building.

13. The non-transitory computer-readable medium of claim 10, wherein the weighting coefficients are calculated to be non-negative numbers only.

14. The non-transitory computer-readable medium of claim 10, wherein the one or more parameters for bounding a variability of the one or more attributes determine a mean and standard deviation for a probability of assigning the first set of activities.

15. The non-transitory computer-readable medium of claim 10, wherein the one or more parameters for bounding a variability of the one or more attributes determine a mean and standard deviation for a probability of assigning the one or more first values and the one or more second values to the one or more attributes of the first activity.

16. The non-transitory computer-readable medium of claim 10, wherein generating the first occupant model includes the steps of generating a first predetermined number of artificial schedules that include the first set of activities and the one or more attributes associated with each activity in the first set of activities;
calculating weighting coefficients for the first predetermined number of artificial schedules, wherein the weighting coefficients transform statistics of the survey schedules to conform to the one or more parameters for bounding a variability of the one or more attributes.

17. The non-transitory computer-readable medium of claim 16, wherein the weighting coefficients are calculated using a least squares algorithm.

18. The non-transitory computer-readable medium of claim 16, wherein the weighting coefficients are calculated to be non-negative numbers only.

19. A computing device comprising:
a data bus;
a memory unit coupled to the data bus;
a processing unit coupled to the data bus and configured to:
receive an identification of a first set of activities that can be assigned to a first occupant and a second occupant of a building, wherein one or more attributes are associated with each activity in the first set of activities;
for each of the one or more attributes, receive one or more parameters for bounding a variability of the one or more attributes for determining an interval range for the one or more attributes, wherein at least one attribute comprises a start time, an arrival time, an end time, a departure time, a number of breaks in a day, or a percentage of time spent performing an activity in a day that is represented by an interval range having an associated probability p, wherein for the at least one attribute, the interval range boundaries $b_{lower}$ and $b_{upper}$ of the associated probability p is determined from a mean value $\mu$ and a standard deviation $\sigma$ of the at least one attribute using the equation:

$$b_{lower} = \mu - \Phi_{inv}\left(\frac{1+p}{2}\right) \cdot \sigma$$

$$b_{upper} = \mu + \Phi_{inv}\left(\frac{1+p}{2}\right) \cdot \sigma,$$

wherein $\Phi_{inv}$ denotes an inverse cumulative distribution function of a standard normal distribution;
generate, via a processor, a first occupant model that includes the first set of activities and the one or more attributes associated with each activity in the first set of activities;
assign a first activity to the first occupant according to the first occupant model, wherein the first activity is chosen from the first set of activities;
assign, for the first occupant, one or more first values to the one or more attributes of the first activity according to the first occupant model;
assign the first activity to the second occupant according to the first occupant model; and
assign, for the second occupant, one or more second values to the one or more attributes of the first activity according to the first occupant model, wherein the one or more second values are different than the one or more first values to the one or more attributes of the first activity.

20. The computing device of claim 19, wherein the memory includes instructions that, when executed by the processing unit, cause the processing unit to perform the receiving, generating, and assigning steps.

21. The method of claim 1, further comprising:
assigning a second activity to the first occupant according to the first occupant model, wherein the second activity is chosen from the first set of activities; and
assigning a third activity to the second occupant according to the first occupant model, wherein the third activity is chosen from the first set of activities, the third activity being different than the second activity.

22. The method of claim 21, further comprising:
assigning, for the first occupant, one or more values to the one or more attributes of the second activity according to the first occupant model; and
assigning, for the second occupant, one or more values to the one or more attributes of the third activity according to the first occupant model.

23. The method of claim 1, wherein an interval range for an attribute comprises a lower value and an upper value based on a probability associated with the interval range.

24. The method of claim 1, wherein an interval range for an attribute comprises a lower value and an upper value based on a probability, mean, and standard deviation associated with the interval range.

25. The method of claim 1, wherein for the at least one attribute, the interval range of an associated probability is determined from a mean value and a standard deviation of the at least one attribute.

* * * * *